No. 678,522. Patented July 16, 1901.
M. SEIPS.
ELECTRICALLY HEATED COOKING UTENSIL.
(Application filed Dec. 8, 1900.)
(No Model.)
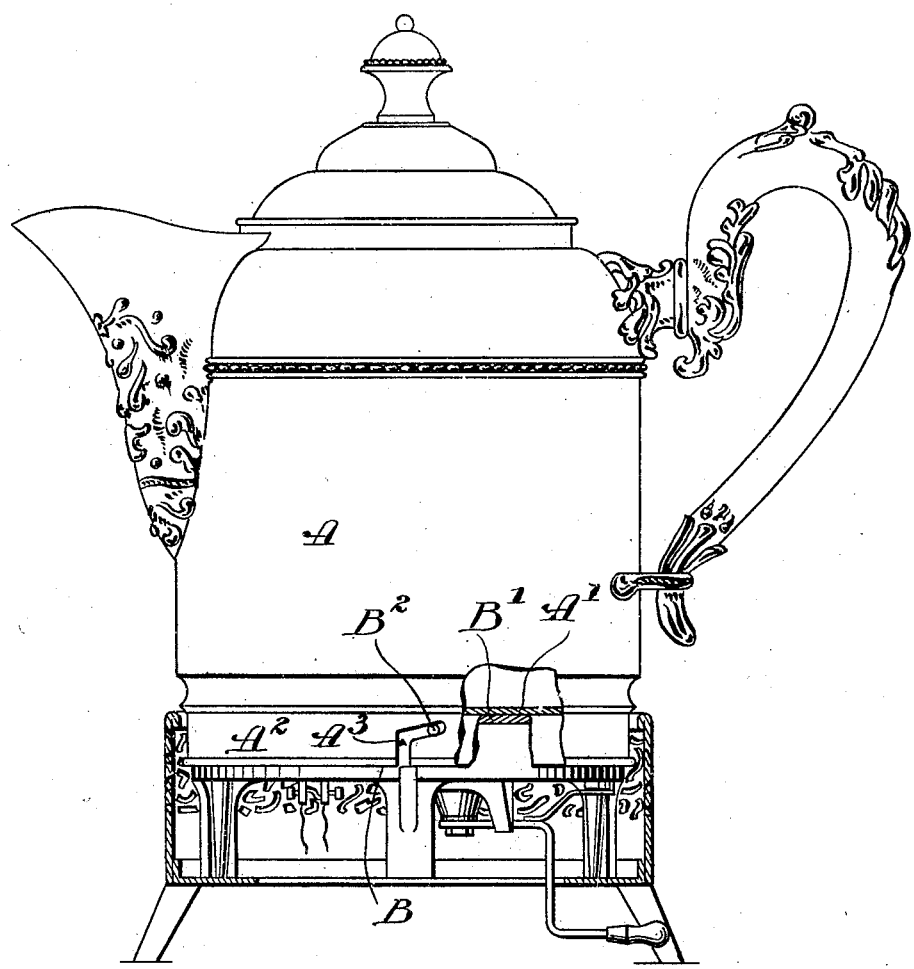
WITNESSES:
INVENTOR
Michael Seips.
BY
ATTORNEY

UNITED STATES PATENT OFFICE.

MICHAEL SEIPS, OF MERIDEN, CONNECTICUT, ASSIGNOR TO MANNING, BOWMAN & COMPANY, OF CONNECTICUT.

ELECTRICALLY-HEATED COOKING UTENSIL.

SPECIFICATION forming part of Letters Patent No. 678,522, dated July 16, 1901.

Application filed December 8, 1900. Serial No. 39,137. (No model.)

*To all whom it may concern:*

Be it known that I, MICHAEL SEIPS, a citizen of the United States, residing at Meriden, Connecticut, have invented certain new and useful Improvements in Electrically-Heated Cooking Utensils, of which the following is a full, clear, and exact description.

My invention relates to electrically-heated cooking utensils, and may be advantageously employed in connection with chafing-dishes, pans, boilers, tea-kettles, coffee-pots, and other receptacles, the object of my invention being to secure a close connection between the bottom of the cooking-receptacle and the heating device, so that the heat may be conducted directly to the receptacle with little or no loss. Heretofore it has been found that in cooking utensils of this character there has been a very considerable loss of heat energy, and it is to overcome this defect that I have devised the improved construction hereinafter referred to.

In the drawing the figure is a side elevation of the cooking utensil, which comprises a receptacle portion A, adapted to contain the food to be cooked or the water to be heated, and the heater portion B, wherein the heat is generated.

B' is the top plate of the heater, and A' is the bottom plate of the receptacle A. The sides and bottom of the receptacle A are preferably integral.

$A^2$ is a downwardly-directed flange projecting below the bottom A' of the receptacle A, which flange $A^2$ preferably corresponds in outline to the shape of the heater-plate B. In the flange $A^2$ is a bayonet-slot $A^3$, provided in any suitable number, and on the side of the heater-plate is a stud $B^2$, provided in a number corresponding to the number of bayonet-slots $A^3$ and arranged so as to register therewith. The flange $A^2$ although projecting below the bottom of the receptacle portion of the cooking utensil is not unsightly when the receptacle is removed from the heater portion, since it is practically nothing more than an extension thereof, the design of which may be made to harmonize properly with the side of the receptacle A.

The function of the flange $A^2$ is twofold—first, to provide a means whereby the bottom A' of the liquid-receptacle may be brought into tight engagement with the top plate B' of the heater, and, second, to cover the line of contact, so as to exclude any air therefrom. Thus none of the heat radiated from the top plate of the heater is lost, but it is all conducted directly to the receptacle A and its contents. This flange $A^2$ may be attached to the receptacle portion A in any approved manner—for example, by spinning, rolling, or swaging the same into engagement therewith.

What I claim is—

1. An electrically-heated cooking utensil comprising a receptacle portion having an annular depending flange, a heater portion comprising a top plate and means to heat the same, a supporting-frame therefor, and an annular jacket carried by said frame and projecting upwardly and around said flange.

2. An electrically-heated cooking utensil comprising a receptacle portion having an annular depending flange, a heater portion comprising a top plate and means to heat the same, a supporting-frame therefor, and an annular jacket carried by said frame and projecting upwardly and around said flange, said heater and flange being provided with means for detachably securing the receptacle portion to the heater portion.

Signed at Meriden, Connecticut, this 6th day of December, 1900.

MICHAEL SEIPS.

Witnesses:
A. L. STETSON,
E. J. POOLEY.